United States Patent
Brown et al.

(10) Patent No.: US 7,685,103 B2
(45) Date of Patent: Mar. 23, 2010

(54) METHOD, SYSTEM, AND PROGRAM FOR PREDICATE PROCESSING BY ITERATOR FUNCTIONS

(75) Inventors: Kevin Brown, San Rafael, CA (US); Raghupathi Keshava Murthy, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 10/675,265

(22) Filed: Sep. 29, 2003

(65) Prior Publication Data
US 2005/0071326 A1 Mar. 31, 2005

(51) Int. Cl.
*G06F 17/30* (2006.01)
(52) U.S. Cl. .......................................................... 707/3
(58) Field of Classification Search .................... 707/2, 707/3
See application file for complete search history.

(56) References Cited

U.S. PATENT DOCUMENTS

| | | | |
|---|---|---|---|
| 4,875,162 A | 10/1989 | Ferriter et al. | |
| 5,239,635 A | 8/1993 | Stewart et al. | |
| 5,412,804 A * | 5/1995 | Krishna | 707/2 |
| 5,649,198 A | 7/1997 | Shibata et al. | |
| 5,778,226 A | 7/1998 | Adams et al. | |
| 5,930,795 A | 7/1999 | Chen et al. | |
| 6,016,489 A | 1/2000 | Cavanaugh et al. | |
| 6,289,336 B1 * | 9/2001 | Melton et al. | 707/3 |
| 6,338,056 B1 | 1/2002 | Dessloch et al. | |
| 6,345,266 B1 * | 2/2002 | Ganguly et al. | 707/1 |
| 6,405,196 B2 | 6/2002 | Day et al. | |
| 6,421,682 B1 | 7/2002 | Craig et al. | |
| 6,775,662 B1 * | 8/2004 | Witkowski et al. | 707/3 |
| 6,801,905 B2 * | 10/2004 | Andrei | 707/2 |
| 6,941,547 B2 | 9/2005 | Duran | |
| 2001/0007987 A1 * | 7/2001 | Igata | 707/3 |
| 2002/0078015 A1 * | 6/2002 | Ponnekanti | 707/1 |
| 2003/0093436 A1 | 5/2003 | Brown et al. | |

(Continued)

FOREIGN PATENT DOCUMENTS

GB 2 342 732 4/2000

OTHER PUBLICATIONS

Cohen, Jeffery, "Genezzo," http://search.cpan.org/~jcohen/Genezzo-0.63/lib/Genezzo/Row/RSTab.pm. Genezzo Systems, Inc. 2003 (p. 1-4).*

(Continued)

*Primary Examiner*—John R. Cottingham
*Assistant Examiner*—Robert T Timblin
(74) *Attorney, Agent, or Firm*—Janaki K. Davda; Konrad Raynes & Victor LLP (57) ABSTRACT

Disclosed is a technique for processing predicates in an iterator function. When an iterator function included in a statement is invoked, one or more predicates included in the statement are obtained. The one or more predicates are applied to a row of data. If applying the one or more predicates results in a match, the row of data is returned. If applying the one or more predicates does not result in a match, a search is performed for another row of data for which application of the one or more predicates results in a match. Also disclosed is a technique for processing predicates in which a statement including an iterator function and one or more predicates is received. A qualification descriptor that describes the one or more predicates and one or more functions that are to be used to evaluate the one or more predicates is created. Then, the iterator function is invoked one or more times, until receiving a done indicator from the iterator function.

39 Claims, 9 Drawing Sheets

U.S. PATENT DOCUMENTS

2003/0126109 A1 7/2003 Couch et al.
2003/0191769 A1 10/2003 Crisan et al.

OTHER PUBLICATIONS

IBM, Corp. *IBM Informix Virtual-Table Reference.* Programmer's Guide. Version 9.4, Mar. 2003, 272 pages.

U.S. Appl. No. 09/888,451 entitled Apparatus and Method for Porting Applications to Different Platforms, filed on Jun. 25, 2001, by A.A. Duran.

United Kingdom Patent Application Serial No. 9822472.8 entitled *Method and Apparatus for Reevaluation of a Boolean Function Applicable to Event Driven Transaction Processing,* filed on Oct. 16, 1998, by P. Mundy.

IBM Corp. Research Disclosure No. 434, Jun. 2000, #150, p. 1134-1135.

U.S. Appl. No. 10/037,659, entitled Method and System for Converting Message Data into Relational Table Format, filed on Jan. 2, 2002, by T. Couch and D. L. Mayhew.

U.S. Appl. No. 09/968,353, entitled *Invocation of Web Services from a Database,* filed on Sep. 28, 2001, by L. Brown, et al. With Appendices A (SOAP Version 1.2); Appendix B (Web Services Description Language (WSDL) 1.1); Appendix C (Web Services Flow Language (WSFL 1.0)); Appendix D (The Web Services Insider, Part 4: Introducing the Web Services Flow); and Appendix E (DB2 XML Entender).

U.S. Appl. No. 10/407,536, entitled Method, System, and Program for Generating a Program Capable of Invoking a Flow of Operations, filed on Apr. 3, 2003, by V. Crisan, et al.

Bulletin of the Technical Committee on Data Engineering, Dec. 2001, vol. 24, No. 4, IEEE Computer Society, including: Maier, A., et al. *DB2 Optimization in Support of Full Text Search,* p. 3-6; Hamilton, J. R., et al. *Micorsoft SQL Server Full-Text Search,* pp. 7-10; Dixon, P. *Basics of Oracle Text Retrieval,* pp. 11-14; Raghaven, P. *Structured and Unstructured Search in Enterprises,* pp. 15-18; Navarro, G., et al. *Indexing Methods for Apparatus String Matching,* pp. 19-27; Gravano, L., et al. *Using q-grams in a DBMS for Approximate String Processing,* pp. 28-34; Singhal, A. *Modern Information Retrieval: A Brief Overview,* pp. 35-43; Raghaven, S., et al. *Integrating Diverse Information Management Systems: A Brief Survey,* pp. 44-52; and *Call for Papers.* 28$^{th}$ International Conference on Very large Data Bases 2002, http//www.cs.ust.hk/vld2002.

IEEE Computer Society, "Bulletin of the Technical Committee on Data Engineering", vol. 24, No. 4, Dec. 2001, 56 pp.

IBM Corporation, "IBM Informix Virtual-Table Interface", Programmer's Guide, Version 9.4, Mar. 2003, 272 pp.

IBM Corporation, Iterators for Accessing Data from Procedural Systems for Representation as Object', Research Disclosure No. 434150, Jun. 2000, pp. 1134-1135.

\* cited by examiner

METHOD, SYSTEM, AND PROGRAM FOR PREDICATE PROCESSING BY ITERATOR FUNCTIONS

BACKGROUND OF THE INVENTION

1. Field of the Invention

The present invention is related to predicate processing by iterator functions.

2. Description of the Related Art

A database system is one in which data is stored, retrieved, and processed. Data records in a relational database management system (RDBMS) in a computer are maintained in tables, which are a collection of rows of data all having the same columns. Each column maintains information on a particular type of data for the data records which comprise the rows of data. Tables in the database are searched using, for example, a Structured Query Language (SQL), which specifies search operations or predicates to perform on columns of tables in the database to qualify rows of data in the database tables that satisfy the search conditions. A predicate is an element of a search condition that expresses or implies a comparison operation (e.g., customer_number>100 or department_name="finance").

Relational DataBase Management System (RDBMS) software using a SQL interface is well known in the art. The SQL interface has evolved into a standard language for RDBMS software and has been adopted as such by both the American National Standards Institute (ANSI) and the International Standards Organization (ISO).

One type of function that may be included in a SQL statement is an iterator function. Iterator functions may also referred to as "table" functions in the DB2® UDB® system (e.g., for OS/390®, Linux®, UNIX®, and Windows® operating systems) available from International Business Machines Corporation. These iterator functions may be written in, for example, C, C++, JAVA®, or SQL. An iterator function receives a set of arguments and returns a table to the SQL statement that invokes the function. A table function may be invoked in the FROM clause of a SELECT statement.

An iterator function may be used to retrieve/extract data from an external source (e.g., a text search engine or a spread sheet) into a database. The result set (i.e., rows of data) returned by an iterator function may be treated as a table and may be referred to as a "virtual table". When an iterator function is used in the FROM clause of a SELECT statement, columns in rows of data returned by the iterator function are mapped to a virtual table, and the columns of the virtual table may be used in predicate expressions and may be joined with columns of other tables.

The following sample SQL statement (1) includes a transpose ("IBM") iterator function:

Statement (1)
```
SELECT vcol1.high, vcol1.low, vcol1.time_stamp
FROM TABLE(FUNCTION transpose("IBM")) vtab1(vcol1),
audit_table aut
WHERE vcol1.time_stamp>'1970-01-01 00:00:00.00000' AND
    vcol1.time_stamp <'1971-01-01 00:00:00.00000' AND
    vcol1.time_stamp = aut.time_stamp;
```

The transpose ("IBM") iterator function operates on timeseries data that stores historical data (e.g., of stock symbols) as binary large objects (BLOBs) and returns a set of rows that are stored in result table "vtab1" with column "vcol1". The column "vcol1" is of a row datatype. A row datatype may have multiple fields, and, in this example, one of the fields is a timestamp field represented by "t". Therefore, vcol1.time_stamp is used to access a timestamp field in a row of data. The predicates on vcol1.time_stamp (i.e., vcol1.time_stamp>'1970-01-01 00:00:00.00000' AND vcol1.time_stamp<'1971-01-01 00:00:00.00000') are used to filter the rows of data with the specified time range and are also used in the join filter (vcol1.time_stamp=aut.time_stamp).

In Statement (1), the qualification (i.e., the predicates) on the table returned by the transpose ("IBM") iterator function is:

```
vcol1.time_stamp>'1970-01-01 00:00:00.00000' AND
vcol1.time_stamp <'1971-01-01 00:00:00.00000' AND
vcol1.time_stamp = aut.time_stamp;
```

Typically, the iterator function creates a virtual table with a result set. Then, the qualification is applied to the virtual table to filter rows of data in the virtual table. In many cases, only a small percentage of rows of data in the virtual table remain after the qualification is applied. Unfortunately, because the qualification is applied after the rows of data are retrieved for the result set, many rows of data are unnecessarily retrieved for the virtual table.

The following sample SQL statement (2) includes a text search iterator function:

Statement (2)
```
SELECT a.isbn, a.year, b.score
FROM articles a,
    text_search('articles', 'abstract', "Bush" in same sentence as
    "recession") b
WHERE a.year >= 2000 AND a.isbn = b.key AND b.score >= 0.9
ORDER BY 3
```

The text_search( ) iterator function returns a key and a score for articles that have "Bush" in the same sentence as "recession" from an external data source "b". The application program submitting SQL statement (2) is interested in articles with a score (assigned by the text_search( ) iterator function) greater than or equal to 0.9. Because the text_search( ) iterator function is not aware of the score qualification, the text_search( ) iterator function returns a virtual table with all articles that have "Bush" in the same sentence as "recession." Not having knowledge about the qualification and filtering rows of data after the virtual table is created by the text_search iterator function is an overhead on query performance and system resources. Note that the database engine would process the a.year>=2000 AND a.isbn=b.key predicates as the iterator function does not have access to table "a". Alternatively, a new text_search( ) function may be written with a new parameter for passing in the score to the text_search( ) function. However, if the overloading of the function is not allowed, this leads to a situation in which a user chooses the right name of the parameter to be passed in, requiring new development and release of software whenever there is a need to add a new predicate to the search criteria.

The DB2® Text Extender product (available from International Business Machines Corporation) has a hard-coded solution to this problem. For more information on the DB2® Text Extender, see "DB2® Optimization in Support of Full Text Search", by Albert Maier and David Simmen, Bulletin of the Technical Committee on Data Engineering, Volume 24, No. 4, IEEE Computer Society, December 2001.

Thus, there is a need in the art for a generalized solution to allow predicate processing by iterator functions.

SUMMARY OF THE INVENTION

Provided are a method, system, and program for processing predicates in an iterator function. When an iterator function included in a statement is invoked, one or more predicates included in the statement are obtained. The one or more predicates are applied to a row of data. If applying the one or more predicates results in a match, the row of data is returned. If applying the one or more predicates does not result in a match, a search is performed for another row of data for which application of the one or more predicates results in a match.

Also disclosed is a method, system, and program for processing predicates in which a statement including an iterator function and one or more predicates is received. A qualification descriptor that describes the one or more predicates and one or more functions that are to be used to evaluate the one or more predicates is created. Then, the iterator function is invoked one or more times, until receiving a done indicator from the iterator function.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
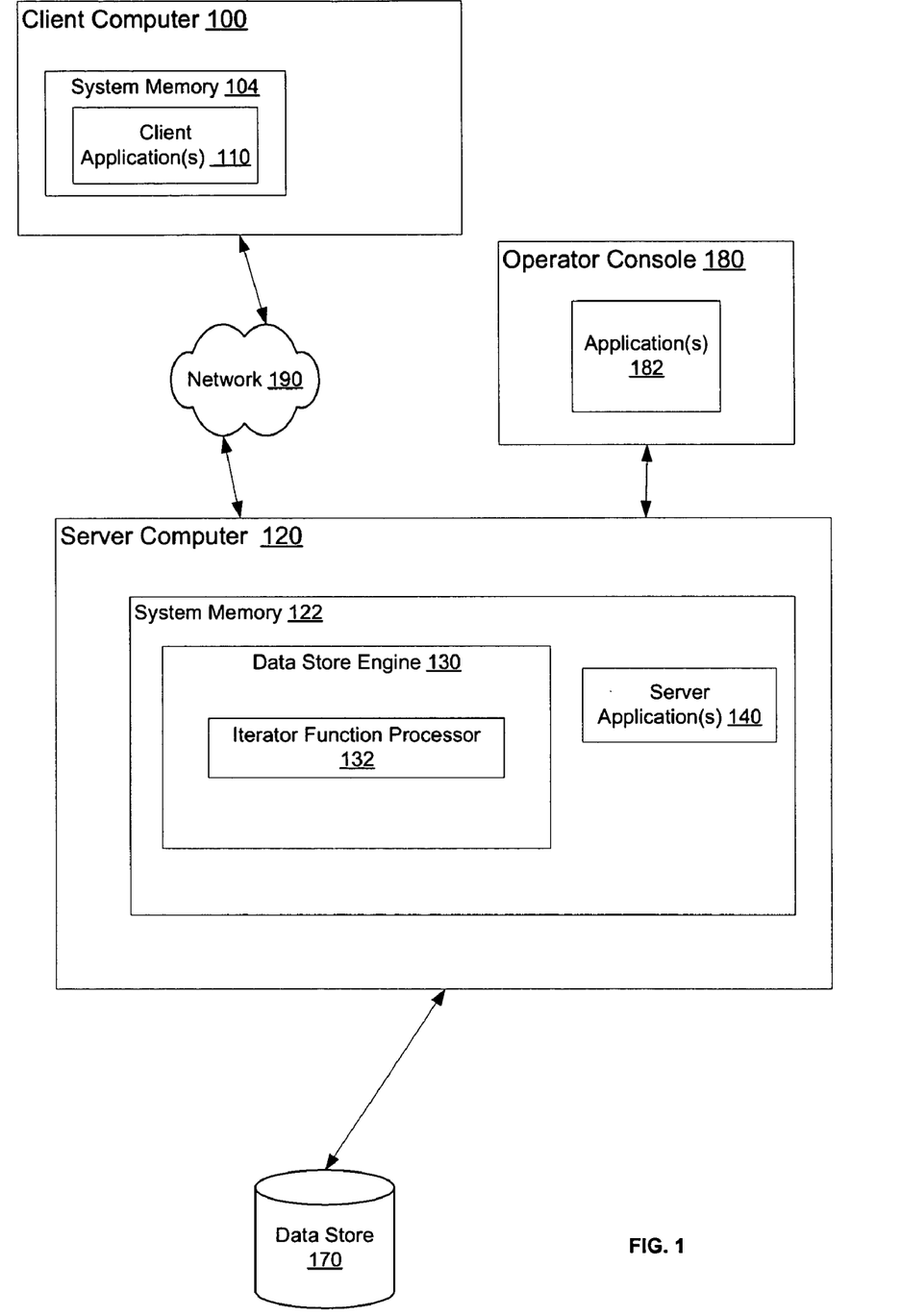
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Source Area Network (LAN), Wide Area Network (WAN), the Internet, an Intranet, the World Wide Web (WWW or "Web") etc. The client computer 100 includes system memory 104, which may be implemented in volatile and/or non-volatile devices. One or more client applications 110 may execute in the system memory 104. The client applications 110 may submit queries (e.g., SQL queries) to the server computer 120 for execution. The queries may include iterator functions.

The server computer 120 includes system memory 122, which may be implemented in volatile and/or non-volatile devices. A data store engine 130 executes in the system memory 122. Programs running in the data store engine 130 (e.g., User Defined Functions (UDFs)) may also issue queries (e.g., SQL queries) to be processed by the data store engine 130, and these queries may include iterator functions (e.g., in the FROM clauses of SELECT statements). A iterator function processor 132 executes as part of the data store engine 130 and may invoke external applications on the network 190 (e.g., on the World Wide Web), such as search engines or Web services. The iterator functions may obtain data from different locations, such as local memory, local disk, or storage sources connected to the network 190. Additionally, one or more server applications 140 execute in system memory 122.

The server computer 120 provides the client computer 100 with access to data in a data store 170 (e.g., a database). Although a single data store 170 is illustrated for ease of understanding, tables 150 and other data in data store 170 may be stored in data stores at other computers connected to server computer 120. Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes tables 150 that are used with implementations of the invention.

Figure 2:
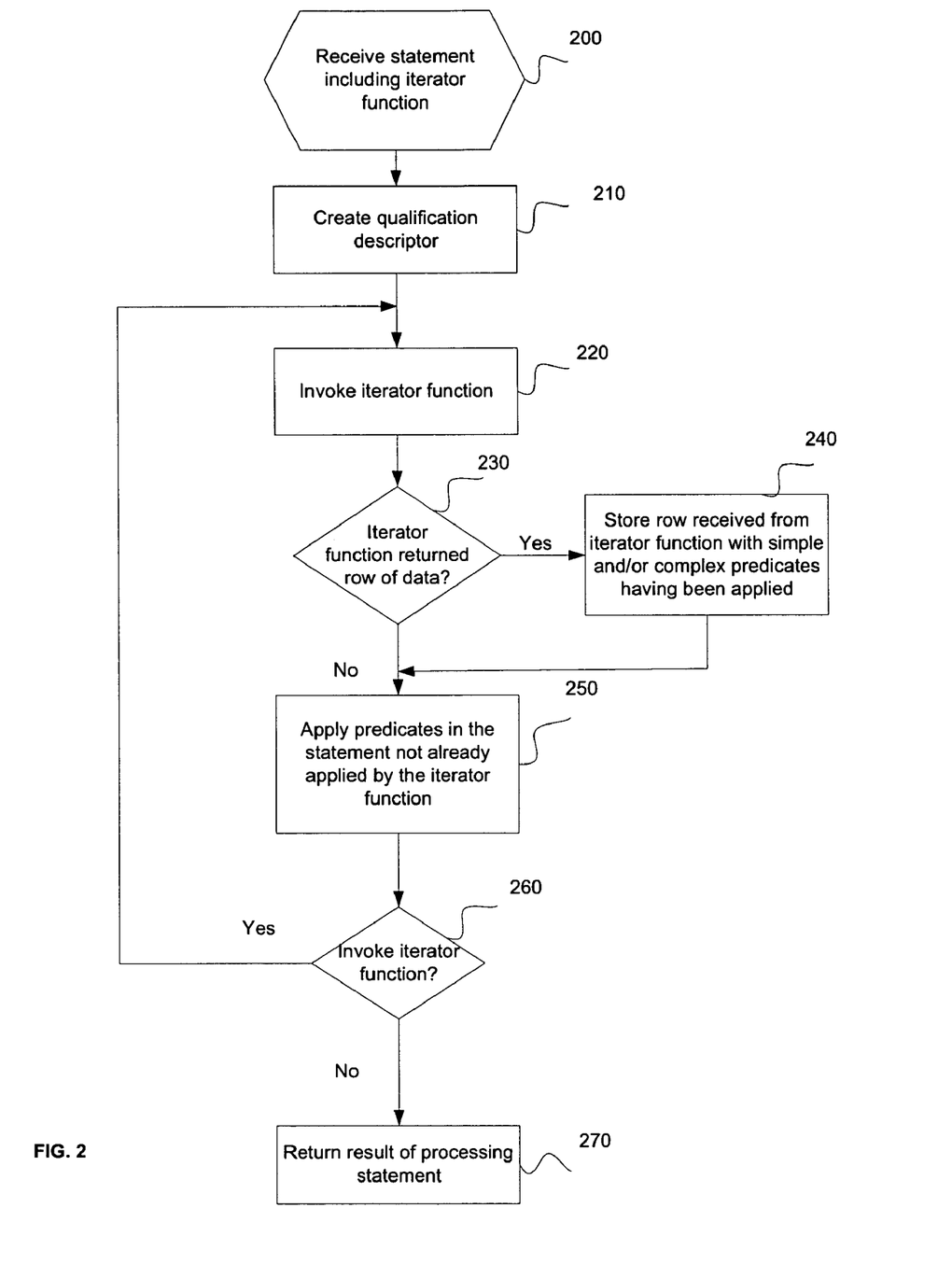
FIG. 2 illustrates logic implemented in a data store engine in accordance with certain implementations of the invention.

FIG. 2 illustrates logic implemented in a data store engine 130 in accordance with certain implementations of the invention. Control begins at block 200 with the data store engine 130 receiving a statement (e.g., a SQL statement) including an iterator function. Although examples herein may refer to SQL statements, implementations of the invention are applicable to statements in other languages (e.g., X-Query). The statement may be received from a client application 110 or an application 182.

In block 210, the data store engine 130 creates a qualification descriptor. A qualification descriptor may be described as an internal representation of a qualification. The term "qualification" refers to predicates. Also, the term "qualifiers" may be used to refer to the predicates. In certain implementations of the invention, a qualification descriptor is a dynamically allocated structure that describes one or more predicates in a query and provides information to evaluate the predicates. In particular, the qualification descriptor describes the predicates in the statement and provides a handle to each function that is used to evaluate one of the predicates. In certain implementations, each predicate is evaluated by a separate function.

The following Example (1) provides a SELECT statement, in which the predicate to be evaluated by the iterator function processor 132 is vcol1.time_stamp>'1994-01-05 00:00:00.0000'.

Example (1)

```
SELECT vcol1.time_stamp, vcol1.high
FROM table (function transpose("IBM")) vtab1(vcol1)
WHERE vcol1.time_stamp > '1994-01-05 00:00:00.0000';
```

Although examples herein may refer to a transpose( ) iterator function, implementations of the invention are applicable to any iterator function, including, for example, the following: text_search( ), web_service( ), or spatial_search( ). For example, for the web_service( ) iterator function, when SQL is used to invoke a web service, the predicates may be pushed across the web to minimize dataflow. Spatial (1) provides an example of a spatial_search( ) iterator function:

Spatial(1)
```
SELECT sp_tab.location, sp_distance(my_tab.myloc,sp_tab.location)
FROM spatial_search('location', "nearest pharmacy") sp_tab
WHERE sp_distance(my_tab.myloc, sp_tab.location) < 2.0 and
    sp_tab.pharmacy_rating = 1;
```

Figure 3A:
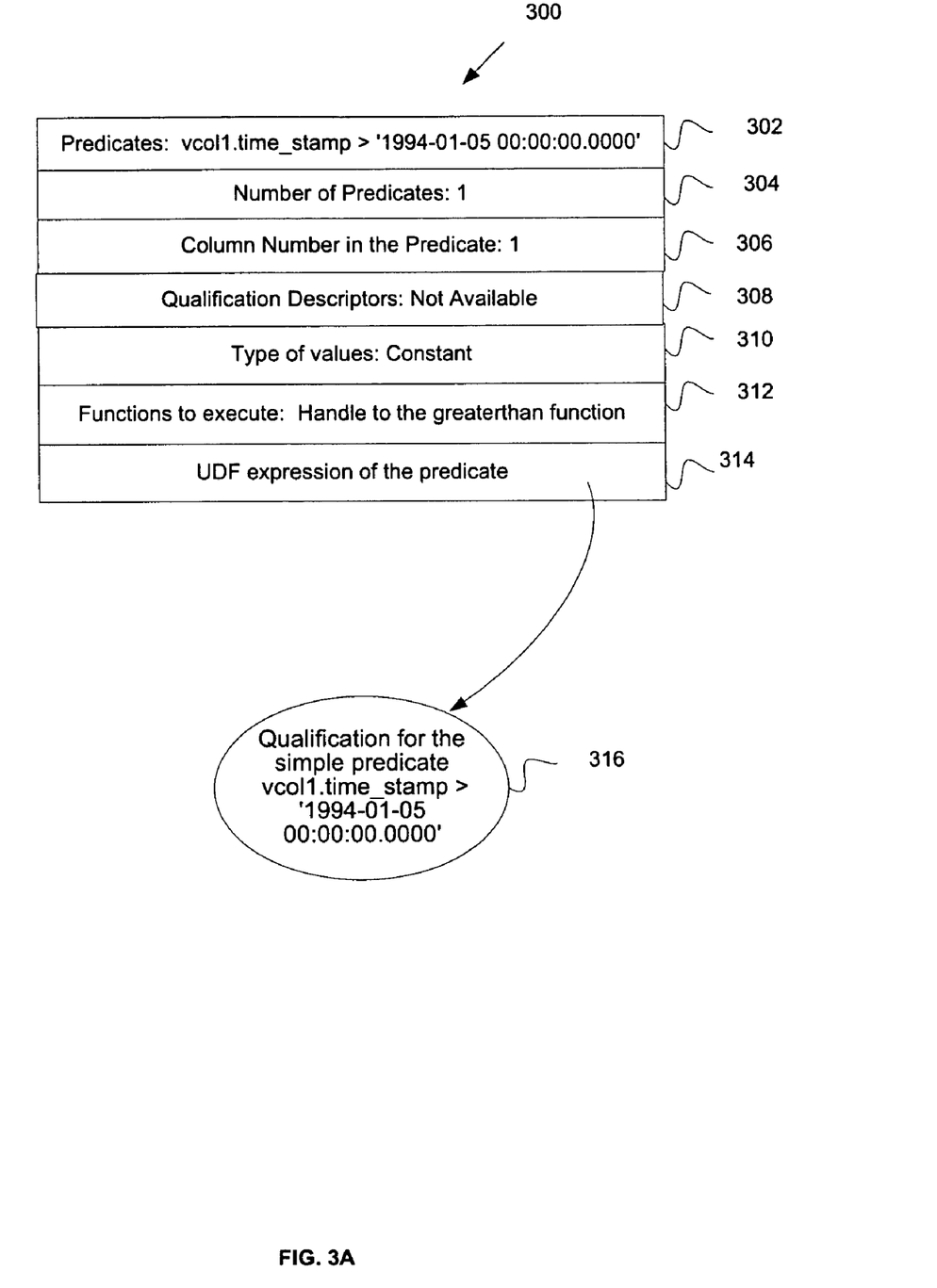
FIGS. 3A, 3B, 3C, and 3D illustrate qualification descriptors in accordance with certain implementations of the invention.

FIG. 3A illustrates a sample qualification descriptor 300 for Example (1) in accordance with certain implementations of the invention. A qualification descriptor 300 includes predicates 302, number of predicates 304, column number in the predicate 306, qualification descriptors 308, type of value 310, functions to execute 312, and a User Defined Function (UDF) expression of the predicate 314. Predicates 302 specifies one or more predicates, and, for Example (1), specifies vcol1.time_stamp>'1994-01-05 00:00:00.0000' A number of predicates 304 specifies the number of predicates to be applied by the iterator function processor 132, and, for Example (1), is one. The column number in the predicate 306 identifies the column of the predicate for which a value is provided, and, for Example (1), is one. The qualification descriptors 308 provide pointers to additional qualification descriptors for each of multiple predicates, and for Example (1), since there is one predicate, additional qualification descriptors 308 are not available. The type of value 310, for Example (1), specifies a constant. The functions to execute 312 provide a handle for each function to be executed, and, for Example (1), provides a handle to the greater than function for Example (1). A UDF expression 314 provides a graph-like representation that is used to process predicates, and, for Example (1), the UDF expression 314 is illustrated by 316.

The following Example (2) provides a SELECT statement, in which the predicates to be evaluated by the iterator function processor 132 are vcol1.time_stamp<'1994-01-05 00:00:00.0000' and vcol1.high<20.00.

Example (2)
```
SELECT vcol1.time_stamp, vcol1.high
FROM table (function transpose("IBM")) vtab1(vcol1)
WHERE vcol1.time_stamp < '1994-01-05 00:00:00.0000' and
    vcol1.high < 20.00;
```

Figure 3B:
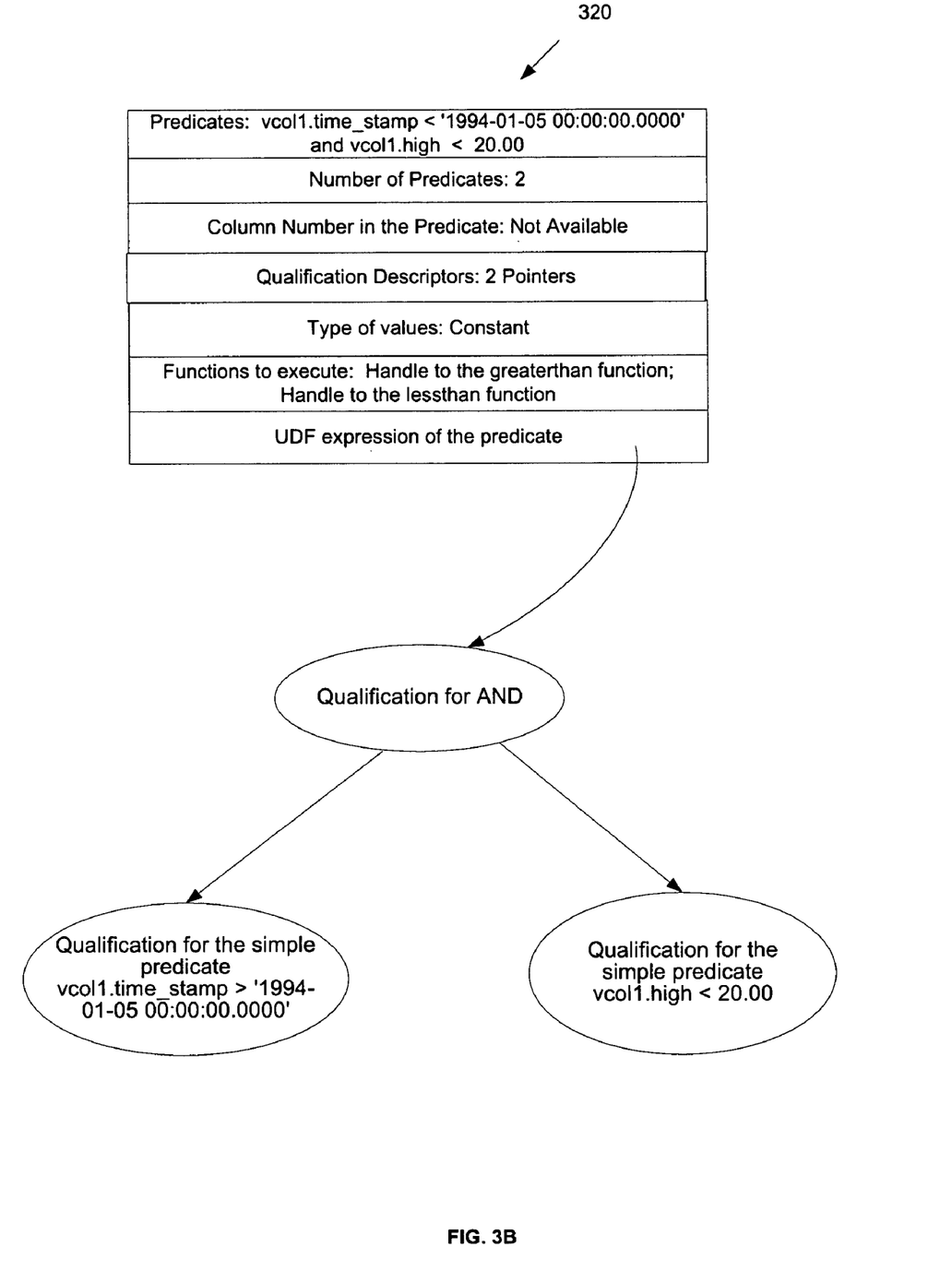

FIG. 3B illustrates a sample qualification descriptor 320 for Example (2) in accordance with certain implementations of the invention. In qualification descriptor 320, the number of predicates is two, and the column number in the predicate is not available as this information is in the qualification for simple predicates. Also, the qualification descriptors include two pointers, one for each predicate, and each pointer points to a qualification descriptor for that predicate. In the UDF expression for the predicate, the qualification for AND is the root.

The following Example (3) provides a SELECT statement, in which the predicates to be evaluated by the iterator function processor 132 are vcol1.time_stamp<'1994-01-05 00:00:00.0000' and vcol1.high<20.00.

Example (3)
```
SELECT vcol1.t, vcol1.high
FROM table (function transpose("IBM")) vtab1(vcol1)
WHERE vcol1.t < '1994-01-05 00:00:00.0000' and
    vcol1.high < 20.00 and vcol1.high = audit_table.high;
```

Figure 3C:
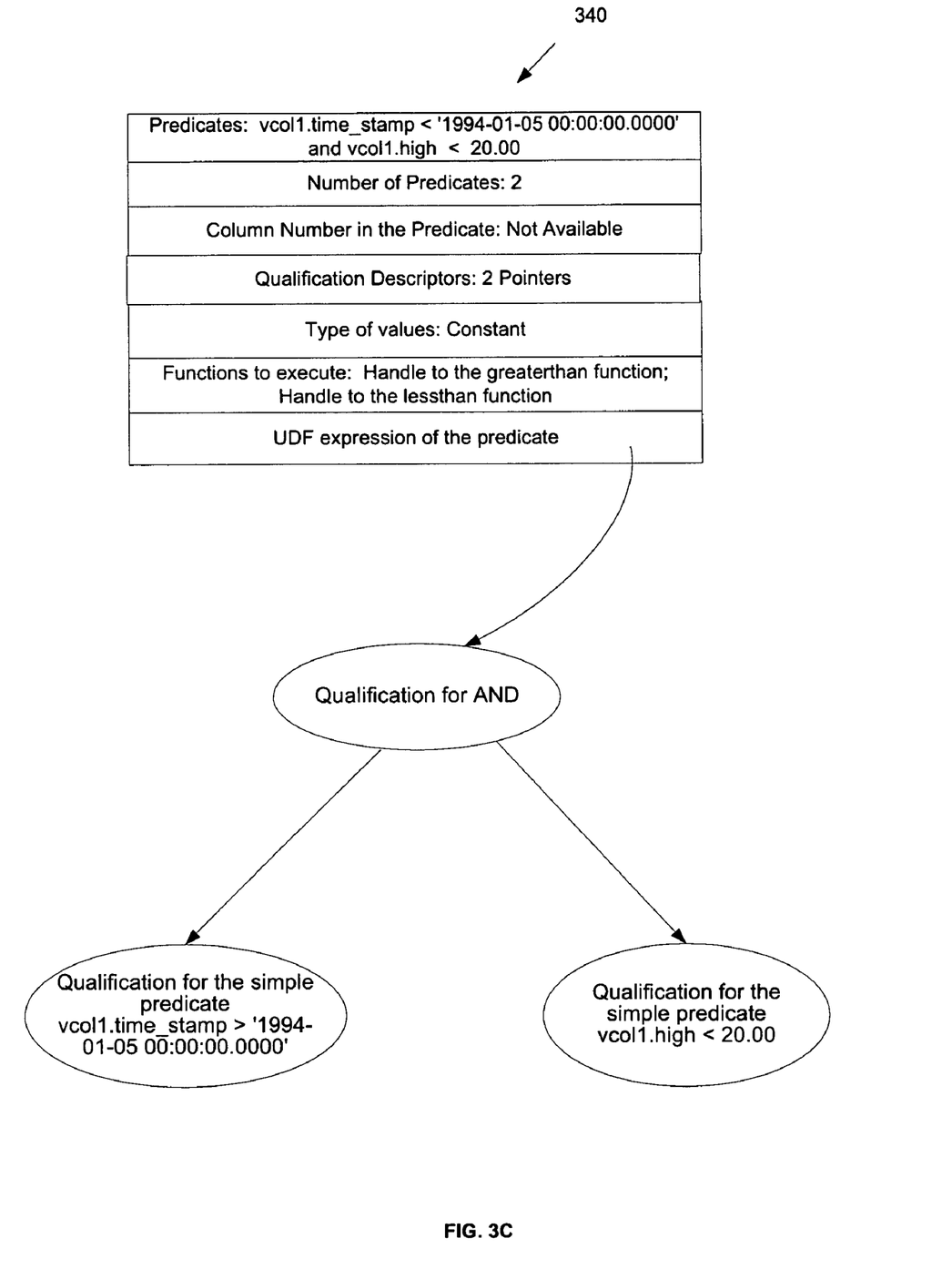

FIG. 3C illustrates a sample qualification descriptor 340 for Example (3) in accordance with certain implementations of the invention. In qualification descriptor 340, the number of predicates is two because, although Example (3) has three predicates, the iterator function processor 132 processes two of the three predicates. In particular, the qualification does not include the join predicate for vcol1.high=audit_table.high.

Example (4) provides a SELECT statement, in which the predicates to be evaluated by the iterator function processor 132 are vcol1.time_stamp<'1994-01-05 00:00:00.0000' and vcol1.high<20.00.

Example (4)
```
SELECT vcol1.t, vcol1.high
FROM table (function transpose("IBM")) vtab1(vcol1)
WHERE vcol1.t < '1994-01-05 00:00:00.0000' or
    vcol1.high = 15.00
```

Figure 3D:
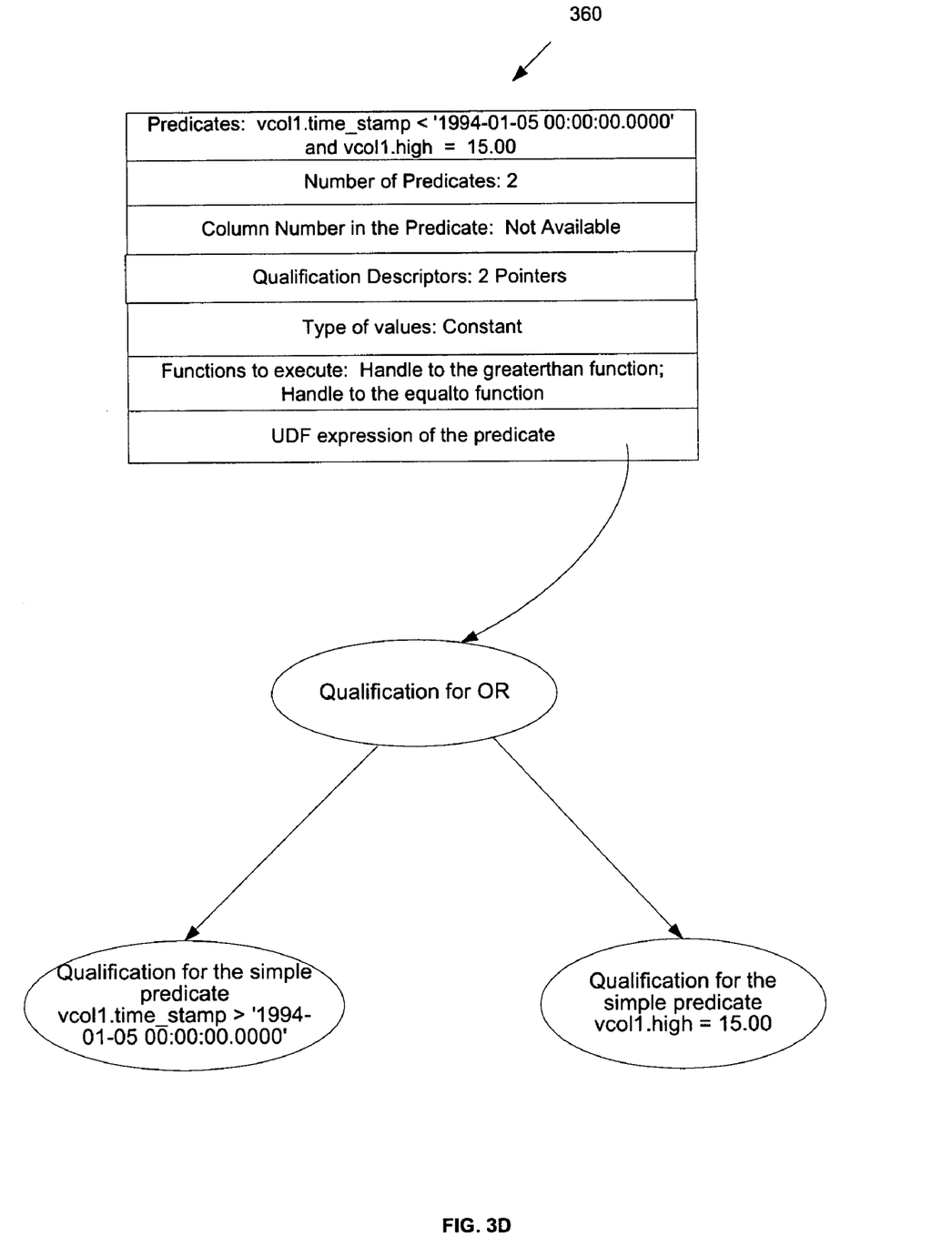

FIG. 3D illustrates a sample qualification descriptor 360 for Example (4) in accordance with certain implementations of the invention. In the UDF expression for the predicate, the qualification for OR is the root.

In block 220, the data store engine 130 invokes the iterator function. The logic for processing the iterator function is represented by the iterator function processor 132. The data store engine 130 may also perform other processing prior to invoking the iterator function. For example, the data store engine 130 performs parsing and optimization before executing the statement including the iterator function. In block 230, the data store engine 130 determines whether the iterator function processor 132 returned a row of data or a done indicator. A done indicator is returned by the iterator function processor 132 after the iterator function processor 132 has processed all rows of data it has to process. If the iterator function processor 132 returned a row of data, then processing continues to block 240, otherwise, processing continues to block 250.

In block 240, the data store engine 130 stores the row of data received from the iterator function processor 132 for which simple and/or complex predicates have already been applied and processing continues to block 250. The predicates passed to and evaluated by the iterator function may be a combination of simple predicates, and the combination may be referred to as a complex predicate. Simple predicates are ones which compare a column value to a constant. In particular, in certain implementations, the iterator function applies simple and/or complex predicates to rows of data and returns a row of data for which application of the predicates results in a match to the qualification. That is, in certain implementations, the iterator function processor 132 applies predicates involving constants against a column in the result set that the iterator function processor 132 returns.

In block 250, the data store engine 130 applies predicates in the statement not already applied by the iterator function processor 132. These predicates may include simple and/or complex predicates not applied by the iterator function processor 132 (e.g., due to lack of resources), join predicates, and predicates on columns not in the result set of the iterator function. That is, in certain implementations, the data store engine 130 and the iterator function processor 132 may each apply some of the simple predicates (i.e., the iterator function processor 132 does not apply all of the simple predicates in these implementations). In block 260, the data store engine 130 determines whether the iterator function is to be invoked again. In certain implementations, the iterator function is invoked again if the iterator function did not return a done indicator to indicate that all rows have been processed. If so, processing loops back to block 220, otherwise, processing continues to block 270. In block 270, the data store engine returns the result of processing the statement (e.g., returns a table or a set of rows of data) to the client application 110 or application 182 that submitted the statement.

Figure 4A:
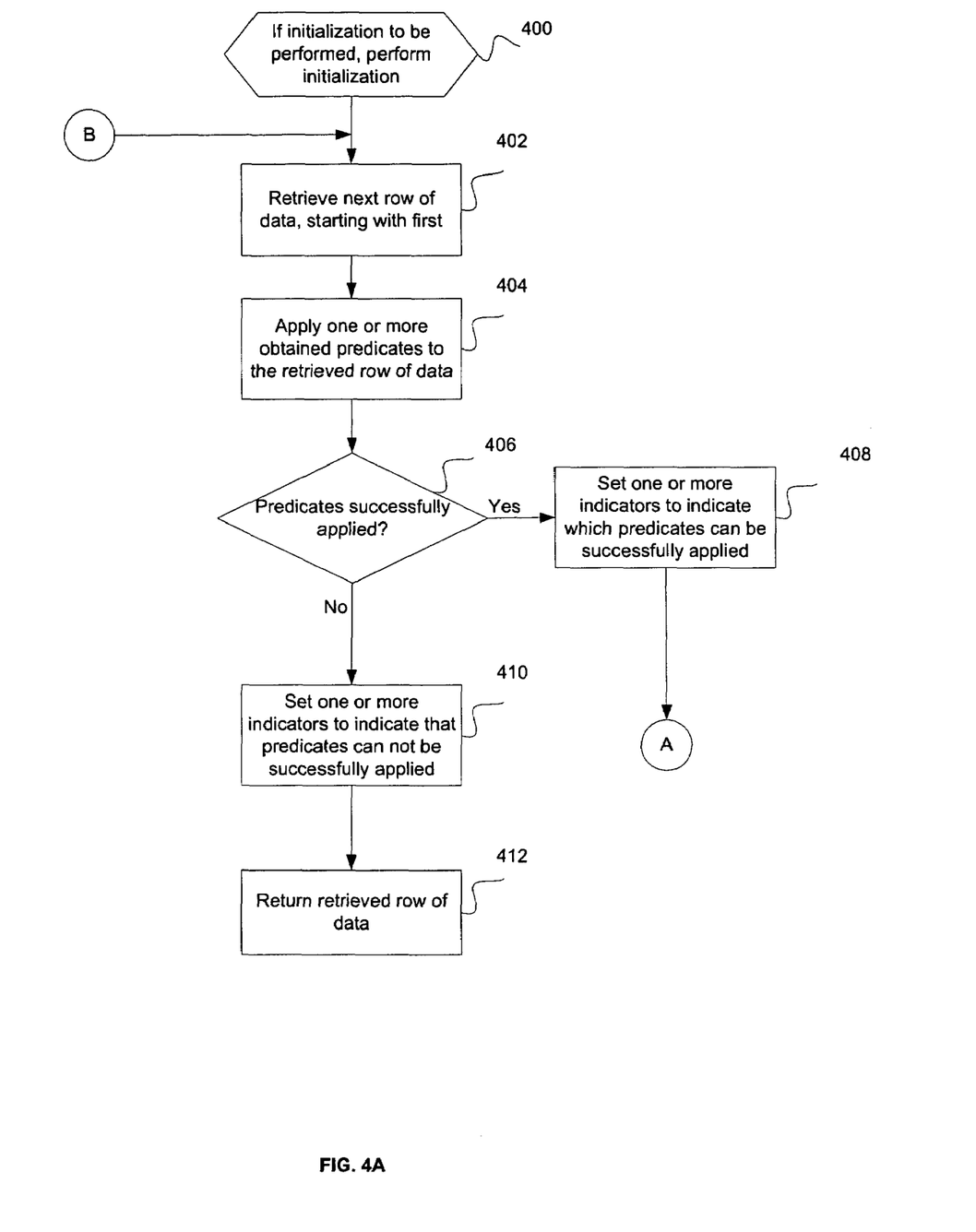
FIGS. 4A and 4B illustrate logic implemented in an iterator function processor in accordance with certain implementations of the invention.
Figure 4B:
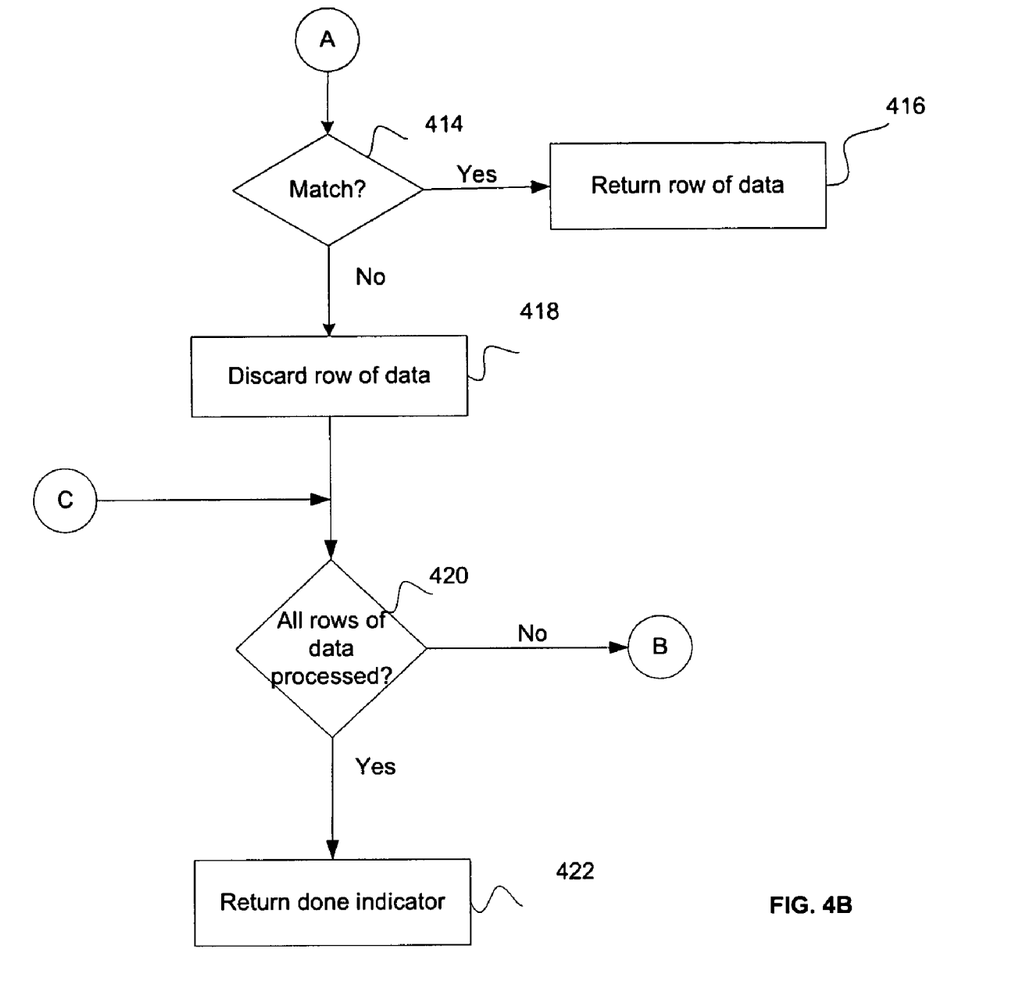

FIGS. 4A and 4B illustrate logic implemented in an iterator function processor 132 in accordance with certain implementations of the invention. Control begins at block 400 with the iterator function processor 132 performing initialization processing if the initialization is to be performed. In particular, when the data store engine 130 invokes the iterator function, the data store engine 130 calls an Application Programming Interface (API) function to get the qualification descriptor that describes the predicates and the functions to evaluate each predicate. Other initialization processing, such as initializing data structures (e.g., predicate evaluators) may also be performed. In block 402, the iterator function processor 132 retrieves the next row of data, starting with the first.

In block 404, the iterator function processor 132 applies one or more of the obtained predicates to the retrieved row of data. That is, for each row of data that is generated by the iterator function processor 132, the appropriate function specified in the qualification descriptor is applied on the corresponding predicate column. For each predicate (e.g., for a built-in datatype or a user-defined datatype), implementations of the invention will provide a function (e.g., a User Defined Function (UDF) or a system defined function) to evaluate that predicate on a column. In certain implementations, each simple predicate is a Boolean expression. If the predicate is an integer comparison (e.g., equal), a handle to the function that performs the integer equal comparison and returns a Boolean value is provided in the qualification descriptor. For each row of data, the iterator function processor 132 calls one or more functions on the data referenced by a predicate, and each of the functions processes the predicate. In certain implementations, one function corresponds to one type of predicate (e.g., an equal comparison). In certain alternative implementations, one function may process more than one type of predicate. The results from the functions may be combined using a predicate expression (e.g., combining AND and OR connectors in the statement).

In certain implementations of the invention, an IBM® Informix® Virtual-Table Interface provides a mechanism to represent and process predicates. The mechanism may be thought of as a set of interfaces to access the predicates and access the type of each predicate and to combine the result of each predicate. This mechanism may also be used to push down other query processing information, such as the requested sort order for the result so that the iterator function may process this information as well. The IBM® Informix® Virtual-Table Interface is further described in the IBM® Informix® Virtual-Table Interface Programmer's Guide, Version 9.1, March 2003, which is available from International Business Machines Corporation.

In block 406, the iterator function processor 132 determines whether the predicates were applied successfully. For example, the iterator function processor 132 is able to apply simple or complex predicates, but not join predicates. Also, the iterator function processor 132 may be unable to process predicates for other reasons, such as a lack of resources or due to unexpected errors. In certain alternative implementations, the iterator function processor 132 may also determine whether some predicates should be applied by the data store engine 130 (e.g., because the data store engine 130 has more processing resources). In certain implementations, the iterator function processor 132 does not process the predicates if any one of the predicates is to be applied by the data store engine 130. In this case, from block 406, if the iterator function processor 132 is able to process all of the predicates, then processing continues to block 408, otherwise, processing continues to block 410.

In certain alternative implementations, the iterator function processor 132 applies those predicates that may be applied by the iterator function processor 132 and sends indicators to the data store engine 130 to apply the remaining predicates. In this case, from block 406, if at least one of the predicates may be processed by the iterator function processor 132, then processing continues to block 408, otherwise, processing continues to block 410.

In block 408, the iterator function processor 132 sets one or more indicators to indicate which predicates were applied by the iterator function processor 132, and processing continues to block 414.

In block 410, the iterator function processor 132 sets one or more indicators to indicate that predicates can not be successfully applied by the iterator function processor 132 and processing continues to block 412. In block 412, the iterator function processor 132 returns the retrieved row to the data store engine 130.

By setting the one or more indicators, the iterator function processor 132 is able to notify the data store engine 130 which predicates the iterator function processor 132 has applied, so that the data store engine 130 can save resources and avoid applying these applied predicates. Also, the data store engine 130 is able to apply those predicates that the iterator function processor 132 did not apply so that the statement initially received that includes an iterator function is evaluated correctly.

In block 414, the iterator function processor 132 determines whether there is a match. In certain implementations of the invention, there is a "match" if the row of data qualifies for selection based on application of one or more predicates (i.e., all of the predicates for that iterator function). If there is a match, processing continues to block 416, otherwise, processing continues to block 418. In block 416, the iterator function processor 132 returns the row of data to the data store engine 130. That is, the iterator function processor 132 returns a row of data if the predicate evaluation returns TRUE (i.e., each of the functions returned in the qualification descriptor return TRUE).

If there is no match, in block 418, the iterator function processor 132 discards the row of data. In block 420, the iterator function processor 132 determines whether all rows of data have been processed. If so, processing continues to block 422, otherwise, processing loops back to block 402 to retrieve another row of data. That is, if there was not a match, the iterator function processor 132 continues searching for a next qualifying row of data.

Thus, to minimize data flow from the iterator function to the data store engine 130, implementations of the invention make predicates for a given query available to the iterator function processor 132. The following sample SQL statement (3) includes a transpose ("IBM") iterator function.

```
                                                              Statement (3)
SELECT vcol1.high, vcol1.low, vcol1.time_stamp
FROM TABLE(FUNCTION transpose("IBM")) vtab1(vcol1),
    audit_table aut
WHERE vcol1.time_stamp>'1970-01-01 00:00:00.00000' AND
    vcol1.time_stamp <'1971-01-01 00:00:00.00000' AND
    vcol1.time_stamp = aut.time_stamp AND
    aut.name = "IBM";
```

The result set from the transpose ("IBM") iterator function is mapped to column "vcol1" of table "vtab1". In this example, since the transpose( ) iterator function returns a row of data (i.e., data of the row datatype), column "vcol1" is of row datatype. In general, an iterator function may return data of any datatype (e.g., system defined or user defined datatypes), however, an iterator function in a statement returns data of one datatype, as specified in the statement. In this example, column "vcol1" has time (t), high (high), low (low) fields.

The iterator function processor 132 calls an API function to get the qualification descriptor that describes the predicates and the functions to evaluate each predicate.

For each row of data that is generated by the iterator function processor 132, the appropriate function specified in the qualification descriptor is applied on the corresponding predicate column.

The qualification descriptor obtained by the transpose( ) iterator function in statement (3) includes the following predicates on the result columns:

```
vcol1.time_stamp>'1970-01-01 00:00:00.00000' AND
vcol1.time_stamp <'1971-01-01 00:00:00.00000' AND
vcol1.time stamp = aut.timestamp
```

The qualification descriptor obtained by the transpose( ) iterator function in statement (3) does not include the predicate aut.name="IBM" because the column "aut.name" is not in the result set of the transpose( ) iterator function. The iterator function processor 132 applies the predicates in the qualification descriptor, and the data store engine 130 applies the predicate aut.name="IBM". Similarly, the data store engine 130 would apply any join predicates.

Implementations of the invention provide a new function, which for ease of reference will be referred to as a get_qualification_descriptor function. In certain implementations of the invention, the get_qualification_descriptor function is an IBM® Informix® Virtual-Table Interface API function that is used to obtain a qualification descriptor when an iterator function is used in the FROM clause of a SELECT statement and may have the format mi_iter_qual_get( ).

The qualification descriptor may be used with an existing IBM® Informix® Virtual-Table Interface API function that is available for the IBM® Informix® Dynamic Server 9.x version (where x in 9.x represents a positive integer value).

The following is example psuedocode for a transpose( ) iterator function:

```
/*ts_transpose_sql( ) is an example transpose iterator function.*/
void*
ts_transpose_sql(ts_timeseries * ts, MI_FPARAM*fparam)
/* "timeseries" refers to a datatype, and ts stores timeseries data;
fparam stores function parameters, such as the state of a function.*/
{
    /*mi_fp_request( ) indicates whether this is a first call from the data store engine.*/
    if (mi_fp_request(fParam) = = SET_INIT) {
        /*if mi_fp_request(fParam) is set to initialization, then the following
        processing is performed.*/
        /*mi_zalloc( ) allocates space for a structure.*/
        state = (struct ts_state *) mi_zalloc(sizeof(struct ts_state));
        /*Now, get the start and stop flags.*/
        /*mi_iter_qual_get( ) obtains predicates on the query by obtaining the
        qualification descriptor and store in qd.*/
        qd=mi_iter_qual_get( );
        if (qd!=NULL)
        /* If the qualification is not NULL, the following processing is
        performed.*/
            /*ts_get_start_and_stop( ) gets the start and stop flags.*/
            ts_get_start_and_stop(state, qd, &state->flags);
        /*timeseries_open( ) opens the timeseries data and
        begins a scan at a given time.*/
        state->tsdesc=timeseries_open(ts);
        /*Timeseries_scan( ) uses the predicates to set
        the window of rows of data to return. */
        state->scan = timeseries_scan(state->tsdesc, state->start, state->stop);
        return (0);
    /* Get the saved state.*/
    state = (struct_ts_state *) mi_fp_funcstate(fParam);
    scan = state->scan;
    tsdesc = state->tsdesc;
    if (MI_FP_REQUEST(fParam) = = SET_END)
        return (0);
    /* get_next_timeseries_elem( ) returns next row of data that qualifies when an additional
    row of data exists and returns TS_SCAN_EOS when stop date is reached. */
    ret = get_next_timeseries_elem(scan, &element);
    switch(ret) {
        case TS_SCAN_EOS: /* End of rows of data.*/
            MI_FP_SETISDONE(fParam, MI_TRUE); /*Set done indicator to true.*/
```

-continued

```
        case TS_SCAN_NULL: /* Column value is NULL, which is a valid value. */
            return (0);
        case TS_SCAN_ELEM: /* A qualifying row of data was retrieved. */
            return(element); /*A qualifying row of data is returned. */
    }
}
/*qd includes the predicates on the statement invoking the iterator function. */
/* ts_get_start_and_stop( ) finds start and stop date times in qualification. */
ts_get_start_and_stop(struct ts_state *state, MI_AM_QUAL_DESC*qd,
            mi_integer*flags)
{
    if (mi_qual_issimple(qd)) {
        if (qual column != 0)
        /*If the qual column is not the timestamp column, return. */
            return;
        /* This is a simple qualification on the timestamp column and the operator
        needs to be found. */
        /*mi_qual_funcname( ) gets the name of the function that will be used to
        evaluate the predicate./*
        funcname = mi_qual_funcname(qd);
        /*mi_qual_constant( ) = gets the value of a constant for evaluating the
        predicate. */
        stamp = mi_qual_constant(qd);
        if (mi_qual_negate(qd) {
        /*If the qualification is negated, the following is performed.*/
                if(funcname = = "greaterthanorequal" ||
                funcname = = "greaterthan")
                    state->stop = stamp;
                else if(funcname = = "lessthanorequal" || funcname = = "lessthan")
                    state->start = stamp;
                else if(funcname = = "notequal" {
                    state->start = stamp;
                    state->stop = stamp;
        } else{
            /* If the qualification is not negated, the following is performed.*/
                if(funcname = = "greaterthanorequal" ||
                funcname = = "greaterthan")
                    state->start = stamp;
                else if(funcname = = "lessthanorequal" ||
                    funcname = = "lessthan")
                    state->stop = stamp;
                else if(funcname = = "equal" {
                    state->start = stamp;
                    state->stop = stamp;
                }
        }
        return
    } else {
        /*If there compound qualification, recurse to find each simple qualification.*/
        pred_cnt = mi_qual_nquals(qd);
        /*mi_qual_nquals( ) returns the number of predicates in the compound
        qualification./*
        for (i=0; i<pred_cnt; i++)
            ts_get_start_and_stop(state, mi_qual_qual(qd,i), flags);
    }
}
```

Thus, implementations of the invention enable a table function to access a qualification and return only rows of data that satisfy the qualification. In many cases, this reduces the number of rows of data in the result set, which leads to fewer retrievals of data and which creates a table that uses less memory. For example, in prior systems in which the data store engine 130 applied the qualification, 10,000 rows of data may be returned by the iterator function. With implementations of the invention, because the iterator function (rather than the data store engine 130) applies the qualification, 10 rows of data may be returned for storage in a virtual table. Additionally, because the iterator function processor 132 returns a next qualifying row, the data store engine 130 calls the iterator function processor 132 fewer times to retrieve rows of data.

IBM, DB2, OS/390, UDB, and Informix are registered trademarks or common law marks of International Business Machines Corporation in the United States and/or other countries. JAVA is a registered trademark or common law mark of Sun Microsystems in the United States and/or other countries. Windows is a registered trademark of Microsoft Corporation in the United States and/or other countries. Linux is a registered trademark of Linus Torvalds in the United States and/or other countries. UNIX is a registered trademark or common law mark of The Open Group in the United States and/or other countries.

Additional Implementation Details

The described techniques for predicate processing by iterator functions may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which certain implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2 4A, and 4B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 4A, and 4B may be implemented in software, hardware, programmable and non-programmable gate array logic or in some combination of hardware, software, or gate array logic.

Figure 5:
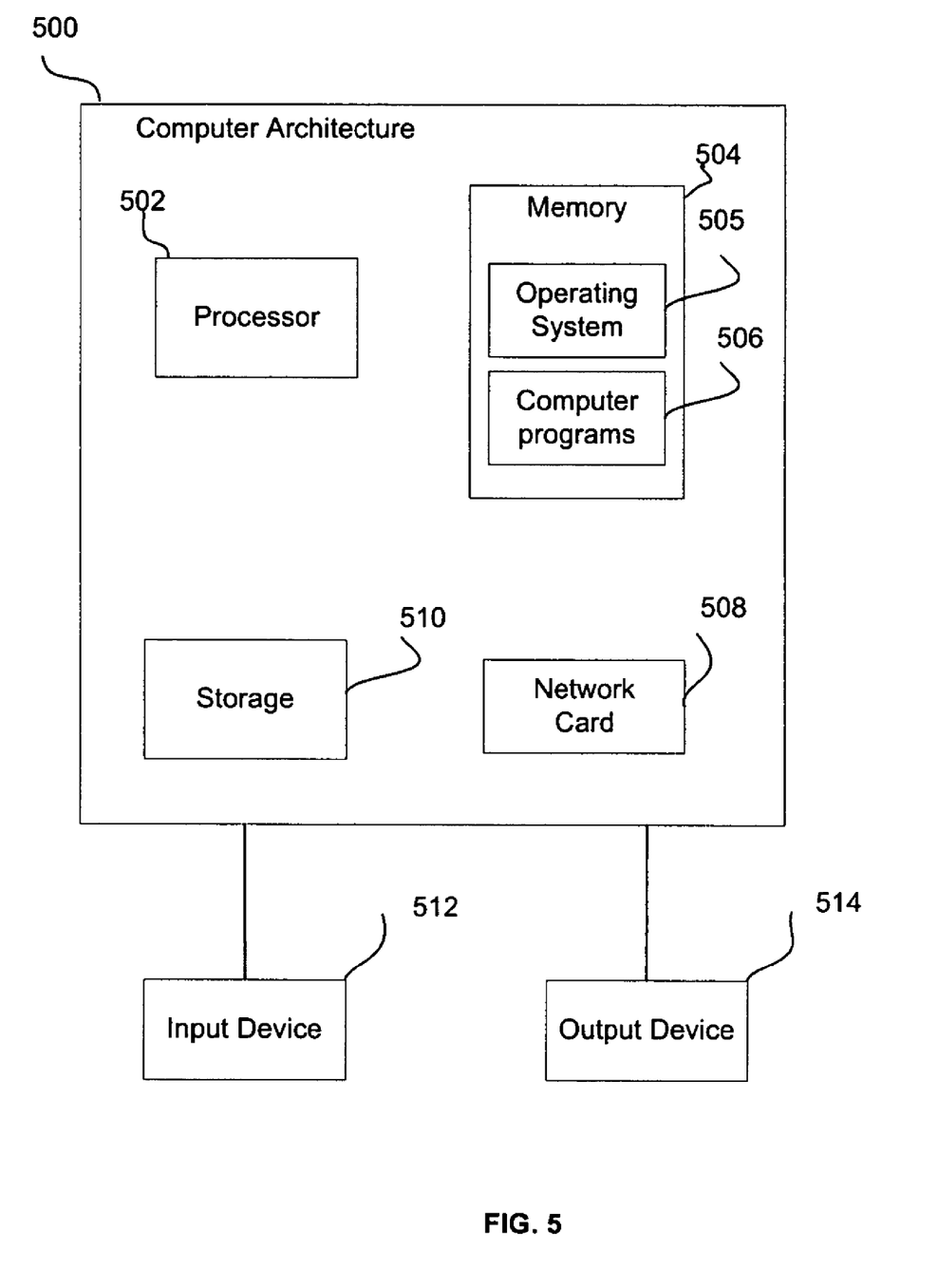
FIG. 5 illustrates an architecture of a computer system that may be used in accordance with certain implementations of the invention.

FIG. 5 illustrates an architecture 500 of a computer system that may be used in accordance with certain implementations of the invention. Client computer 100, server computer 120, and/or operator console 180 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for processing predicates in an iterator function, comprising:
    under control of an iterator function processor that executes as part of a data store engine, when an iterator function included in a statement is invoked,
        obtaining one or more predicates included in the statement;
        applying the one or more predicates to a row of data;
        if applying the one or more predicates results in a match, returning the row of data; and
        if applying the one or more predicates does not result in a match, searching for another row of data for which application of the one or more predicates results in a match.

2. The method of claim 1, wherein obtaining the one or more predicates comprises:
    obtaining a qualification descriptor that describes the one or more predicates and one or more functions that are used to process the one or more predicates.

3. The method of claim 2, wherein each function is used to process one of the predicates.

4. The method of claim 1, wherein each of the one or more predicates comprises a simple predicate.

5. The method of claim 1, wherein the iterator function is invoked by the data store engine and further comprising:
    returning the row of data to the data store engine.

6. A method for processing predicates, comprising:
    under control of a data store engine,
        receiving a statement including an iterator function and one or more predicates;
        creating a qualification descriptor that describes the one or more predicates and one or more functions that are to be used to evaluate the one or more predicates; and
        invoking the iterator function one or more times, until receiving a done indicator from the iterator function, wherein each invocation of the iterator function results in receiving either a row of data for which at least one predicate has been applied or the done indicator and wherein one or more of the predicates included in the statement that have not been applied by the iterator function are applied by the data store engine.

7. The method of claim 6, wherein the qualification descriptor provides a handle to each of the one or more functions.

8. The method of claim 6, further comprising:
    when the iterator function is invoked, receiving an indication from the iterator function indicating which of the one or more predicates were applied by the iterator function.

9. The method of claim 6, further comprising:
when the iterator function is invoked, receiving a row of data from the iterator function that matches the qualification of the one or more predicates.

10. The method of claim 9, further comprising:
applying one or more additional predicates to the received row of data, wherein the one or more additional predicates refer to a column of data that is not in a result set generated by the iterator function.

11. The method of claim 9, further comprising:
applying one or more additional predicates to the received row of data, wherein the one or more additional predicates performs a join between two tables.

12. A method for processing predicates, comprising:
under control of a data store engine,
    receiving a statement including an iterator function and one or more predicates;
    creating a qualification descriptor that describes the one or more predicates and one or more functions that are to be used to evaluate the one or more predicates; and
    invoking the iterator function;
under control of an iterator function processor,
    retrieving the qualification descriptor;
    obtaining a row of data that matches at least one of the one or more predicates in the qualification descriptor;
    setting indicators to indicate which of the one or more predicates have been applied by the iterator function processor; and
    returning the row of data to the data store engine; and
under control of the data store engine,
    applying any of the one or more of the predicates included in the statement that have not been applied by the iterator function processor.

13. The method of claim 12, wherein the qualification descriptor describes one or more simple predicates to be applied by the iterator function processor.

14. An article of manufacture including a program for processing predicates in an iterator function, wherein the program causes operations to be performed, the operations comprising:
under control of an iterator function processor that executes as part of a data store engine, when an iterator function included in a statement is invoked,
    obtaining one or more predicates included in the statement;
    applying the one or more predicates to a row of data;
    if applying the one or more predicates results in a match, returning the row of data; and
    if applying the one or more predicates does not result in a match, searching for another row of data for which application of the one or more predicates results in a match.

15. The article of manufacture of claim 14, wherein operations for obtaining the one or more predicates further comprise:
obtaining a qualification descriptor that describes the one or more predicates and one or more functions that are used to process the one or more predicates.

16. The article of manufacture of claim 15, wherein each function is used to process one of the predicates.

17. The article of manufacture of claim 14, wherein each of the one or more predicates comprises a simple predicate.

18. The article of manufacture of claim 14, wherein the iterator function is invoked by the data store engine and wherein the operations further comprise:
returning the row of data to the data store engine.

19. An article of manufacture including a program for processing predicates, wherein the program causes operations to be performed, the operations comprising:
under control of a data store engine,
    receiving a statement including an iterator function and one or more predicates;
    creating a qualification descriptor that describes the one or more predicates and one or more functions that are to be used to evaluate the one or more predicates; and
    invoking the iterator function one or more times, until receiving a done indicator from the iterator function, wherein each invocation of the iterator function results in receiving either a row of data for which at least one predicate has been applied or the done indicator and wherein one or more of the predicates included in the statement that have not been applied by the iterator function are applied by the data store engine.

20. The article of manufacture of claim 19, wherein the qualification descriptor provides a handle to each of the one or more functions.

21. The article of manufacture of claim 19, wherein the operations further comprise:
when the iterator function is invoked, receiving an indication from the iterator function indicating which of the one or more predicates were applied by the iterator function.

22. The article of manufacture of claim 19, wherein the operations further comprise:
when the iterator function is invoked, receiving a row of data from the iterator function that matches the qualification of the one or more predicates.

23. The article of manufacture of claim 22, wherein the operations further comprise:
applying one or more additional predicates to the received row of data, wherein the one or more additional predicates refer to a column of data that is not in a result set generated by the iterator function.

24. The article of manufacture of claim 22, wherein the operations further comprise:
applying one or more additional predicates to the received row of data, wherein the one or more additional predicates performs a join between two tables.

25. An article of manufacture including a program for processing predicates, wherein the program causes operations to be performed, the operations comprising:
under control of a data store engine,
    receiving a statement including an iterator function and one or more predicates;
    creating a qualification descriptor that describes the one or more predicates and one or more functions that are to be used to evaluate the one or more predicates; and
    invoking the iterator function; and
under control of an iterator function processor,
    retrieving the qualification descriptor;
    obtaining a row of data that matches at least one of the one or more predicates in the qualification descriptor; and
    setting indicators to indicate which of the one or more predicates have been applied by the iterator function processor; and
    returning the row of data to the data store engine; and
under control of the data store engine,
    applying any of the one or more of the predicates included in the statement that have not been applied by the iterator function processor.

26. The article of manufacture of claim 25, wherein the qualification descriptor describes one or more simple predicates to be applied by the iterator function processor.

27. A computer system having at least one program for processing predicates in an iterator function, comprising:
under control of an iterator function processor that executes as part of a data store engine, when an iterator function included in a statement is invoked,
obtaining one or more predicates included in the statement;
applying the one or more predicates to a row of data;
if applying the one or more predicates results in a match, returning the row of data; and
if applying the one or more predicates does not result in a match, searching for another row of data for which application of the one or more predicates results in a match.

28. The computer system of claim 27, wherein obtaining the one or more predicates comprises:
obtaining a qualification descriptor that describes the one or more predicates and one or more functions that are used to process the one or more predicates.

29. The computer system of claim 28, wherein each function is used to process one of the predicates.

30. The computer system of claim 27, wherein each of the one or more predicates comprises a simple predicate.

31. The computer system of claim 27, wherein the iterator function is invoked by the data store engine and further comprising:
returning the row of data to the data store engine.

32. A computer system having at least one program for processing predicates, comprising:
under control of a data store engine,
receiving a statement including an iterator function and one or more predicates;
creating a qualification descriptor that describes the one or more predicates and one or more functions that are to be used to evaluate the one or more predicates; and
invoking the iterator function one or more times, until receiving a done indicator from the iterator function, wherein each invocation of the iterator function results in receiving either a row of data for which at least one predicate has been applied or the done indicator and wherein one or more of the predicates included in the statement that have not been applied by the iterator function are applied by the data store engine.

33. The computer system of claim 32, wherein the qualification descriptor provides a handle to each of the one or more functions.

34. The computer system of claim 32, further comprising:
when the iterator function is invoked, receiving an indication from the iterator function indicating which of the one or more predicates were applied by the iterator function.

35. The computer system of claim 32, further comprising:
when the iterator function is invoked, receiving a row of data from the iterator function that matches the qualification of the one or more predicates.

36. The computer system of claim 35, further comprising:
applying one or more additional predicates to the received row of data, wherein the one or more additional predicates refer to a column of data that is not in a result set generated by the iterator function.

37. The computer system of claim 35, further comprising:
applying one or more additional predicates to the received row of data, wherein the one or more additional predicates performs a join between two tables.

38. A computer system for processing predicates, comprising:
under control of a data store engine,
means for receiving a statement including an iterator function and one or more predicates;
means for creating a qualification descriptor that describes the one or more predicates and one or more functions that are to be used to evaluate the one or more predicates; and
means for invoking the iterator function; and
under control of an iterator function processor,
means for retrieving the qualification descriptor;
means for obtaining a row of data that matches at least one of the one or more predicates in the qualification descriptor;
means for setting indicators to indicate which of the one or more predicates have been applied by the iterator function processor; and
means for returning the row of data to the data store engine; and
under control of the data store engine,
means for applying any of the one or more of the predicates included in the statement that have not been applied by the iterator function processor.

39. The computer system of claim 38, wherein the qualification descriptor describes one or more simple predicates to be applied by the iterator function processor.

* * * * *